H. H. TRENOR.
Car Coupling.

No. 57,014. Patented Aug. 7, 1866.

Witnesses:

Inventor:

UNITED STATES PATENT OFFICE.

HENRY H. TRENOR, OF NEW YORK, N. Y.

IMPROVED CAR-COUPLING.

Specification forming part of Letters Patent No. 57,014, dated August 7, 1866.

*To all whom it may concern:*

Be it known that I, HENRY H. TRENOR, of New York, in the county and State of New York, have invented certain new and useful Improvements in Car-Couplings; and I hereby declare the following to be a full, clear, and exact description of the same, reference being had to the accompanying drawings.

My invention relates to the construction of improved mode of coupling railroad-cars; and its object is to effect certain improvements in that kind of mechanism for accomplishing these objects for which Letters Patent Nos. 50,517, 50,518 were granted me on the 17th October, 1865. In these patents the advantages claimed to arise from the use of my invention are that the car-wheels, when pressed by the brakes, are not subjected to any undue strain, the running-gear is not so liable to become worn and damaged, and the brakes may be applied either by hand or steam instantaneously and simultaneously to the wheels of one car or of the whole train, according to the will of the engineer.

In my present invention is shown a simple yet effective mode of accomplishing these results. This will best be seen and understood by reference to the drawings, in which is also represented the method of coupling or connecting cars as claimed in the above-mentioned patent granted to me.

Figure 1:
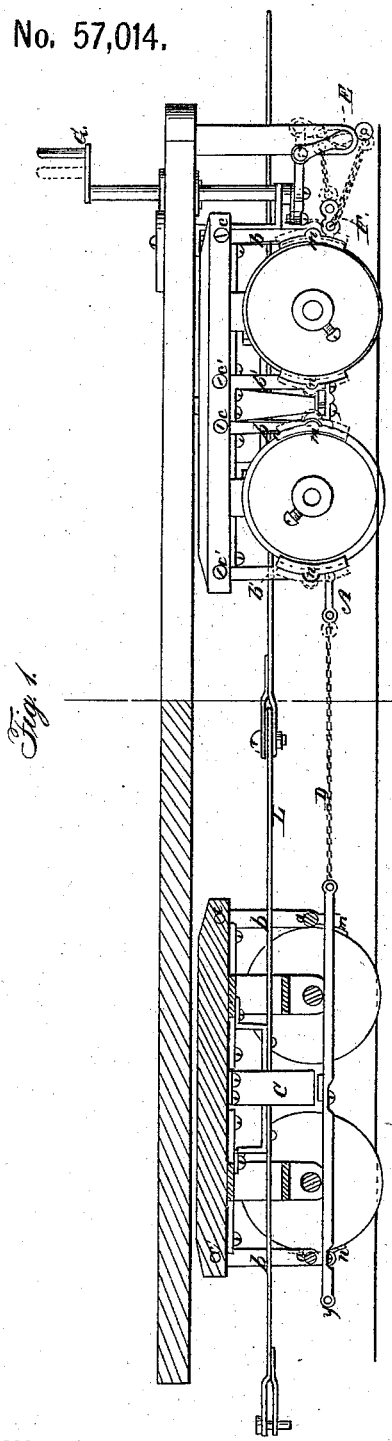
Figure 2:
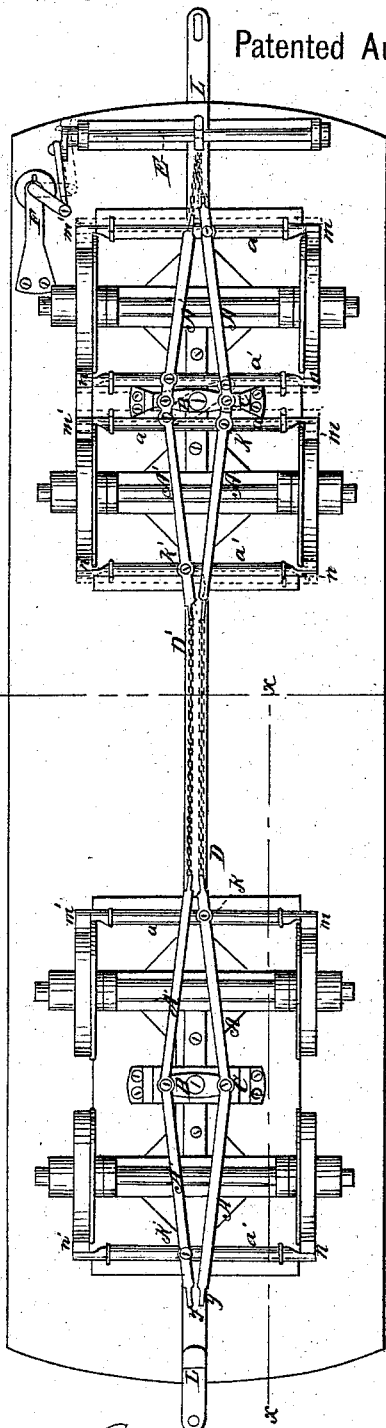

In the drawings, Figure 1 represents, in section and in elevation, the running-gear of a car mounted on two four-wheeled trucks, the brakes being actuated by my improved mechanism. The section in this figure is on the line $x\,x$, Fig. 2. Fig. 2 is a plan view of the same, looking up from beneath the car, the brakes and mechanism for actuating the same being represented in two positions on the right-hand truck.

The brakes may be applied to each side of each wheel, as represented in the right-hand truck in Figs. 1 and 2, or only one brake may be applied to each wheel, as shown in the trucks on the left. The brakes $m\,m'$ and $n\,n'$ on the same side of each pair of wheels, though on opposite sides of the truck, are held in place and connected together by a frame-work consisting of a connecting rod or bar, $a$, transverse to the length of the car and stretching across from one brake to the other, to the ends of which bar the brakes are secured, and of two lever-arms, $b\,b$, which are fastened to the bar $a$ near the brakes $m\,m'$, respectively, and extend therefrom to the truck, to which they are pivoted at $c$. By this arrangement the frame-work and brakes are made capable of a rocking motion on the pivots $c$, and the brakes may be pressed against or withdrawn from the wheels. The brakes thus arranged are actuated by means of a system of rods and connecting chains or links.

The rods A A', Fig. 2, are secured to the ends of a bar or crank, B, which is pivoted to a frame, C, and is so placed as to be parallel with the bed of the car and transverse to its length, moving on a vertical axis. The frame C and crank B are placed in the center of each truck, between the two pairs of wheels. The rods A A' in each truck are secured to the brakes in the following manner: The rod A is secured to the transverse bars $a\,a$ of the brakes $m\,m'\,m\,m'$ at $k\,k$, as shown in Fig. 2, the rod A' being secured in like manner to the transverse bars $a'\,a'$, connecting the brakes $n\,n'\,n\,n'$ on each pair or set of wheels.

It will be seen that the connecting-rods A A' are alternately secured to the brakes, and that each rod is connected with the brakes which occupy the same relative position on each set of wheels, and that at the same time the rods are connected with each other by being secured or pivoted to the opposite ends of the cranks B.

This mechanism is actuated by means of a rock-shaft, E, Figs. 1 and 2, to which the ends of the rods A A' are secured by chains or links, in connection with a crank, F, and wheel or handle G.

In the drawings the position of the brakes and mechanisms, when the brakes are removed from contact with the wheels, is shown in red lines. The crank being turned to the left, as shown in Figs. 1 and 2, the rock-shaft E is caused to revolve in the same direction, drawing with it the rod A, which is attached to the under side of the shaft. The rod A being moved actuates the brakes $m\,m'\,m\,m'$, with which it is connected at $k\,k$, drawing them away from the wheels. Being secured to one end of the crank B, it also draws that end with it, causing the other end of the crank to move in an opposite direction, as indicated in the right-hand truck in Fig. 2. By this movement of the crank B the rod A', which is secured to it as above explained, is made to move in a direction exactly opposite to that of the rod A, and consequently the brakes $n$ $n'$, to which the rod A' is pivoted at $k'$ $k'$, follow the movement of the rod, and are likewise removed from contact with the wheels. The crank or bar B is thus made the medium through which motion is communicated from the rod which is directly actuated by the rock-shaft E to the rod which is not thus actuated.

The motion of the rods is communicated from one truck to another by means of the chains or links D D', which connect the like rods A A' on both trucks.

By this arrangement the brakes may be applied simultaneously to one or more cars, or to the whole train, the rods A A' of the different cars being connected by links or chains extending from the ends $y$ $y'$ of rods A A' to corresponding rods on the next car. The brakes thus connected may be instantaneously applied to the whole train under the direction and control of the engineer, and the mechanism may be actuated by steam or other power.

The cars are coupled or connected together by means of links L L, extending under the trucks. A link is firmly and immovably secured to each truck, and extends both ways, so as to connect with the link secured to the next truck of the same car or to the link on the adjoining truck of the next car. At the points where the links meet they may be secured, as shown in the drawings, a hole being formed in the end of one link, which end is placed in a jaw formed on the end of the next link, and in this position the two ends are held by a pin or bolt which passes through the hole and is secured by nuts to the jaws, or any other means of uniting the ends may be resorted to.

It will be seen that by employing this method of coupling all strain is taken off the body of the car, and the cars are, as it were, strung on the links L L, which form a continuous chain and support all or nearly all the strain, which would otherwise come directly upon the bodies of the cars.

I do not claim the herein-described improved mechanism for actuating car-brakes, as I have made the same the subject of an application now pending before the Patent Office; but

What I claim, and desire to secure by Letters Patent, is—

The combination, with the trucks, of a coupling-bar extending throughout the whole length of the car, so that the cars shall be relieved from the strain due to the traction of the whole train, substantially as herein shown and set forth.

In testimony whereof I have signed my name to this specification before two subscribing witnesses.

HENRY H. TRENOR.

Witnesses:
DUNCAN SMITH,
H. B. HATHAWAY.